United States Patent [19]

Klüting

[11] 4,082,008

[45] Apr. 4, 1978

[54] POSITIONING MECHANISM FOR AUTOMOTIVE SEAT, WINDOW OR SIMILAR PART

[75] Inventor: Bernd Klüting, Radevormwald, Germany

[73] Assignee: Keiper KG, Remscheid-Hasten, Germany

[21] Appl. No.: 728,012

[22] Filed: Sep. 29, 1976

[30] Foreign Application Priority Data

Oct. 3, 1975 Germany .............................. 2544174

[51] Int. Cl.² ............................................. G05G 5/06
[52] U.S. Cl. ........................................ 74/531; 74/533; 192/8 C
[58] Field of Search ................ 74/29, 531, 533, 89.18, 74/422

[56] References Cited

U.S. PATENT DOCUMENTS

| 1,041,265 | 10/1912 | Fuchs | 74/29 |
| 3,006,214 | 10/1961 | Hollar, Jr. | 74/531 |
| 3,236,121 | 2/1966 | Goowik et al. | 74/531 |
| 3,423,785 | 1/1969 | Pickles | 74/531 |

Primary Examiner—Benjamin W. Wyche
Assistant Examiner—Wesley S. Ratliff, Jr.
Attorney, Agent, or Firm—Michael J. Striker

[57] ABSTRACT

A positioning mechanism for moving a window of an automotive vehicle or adjusting the seat thereof has a pinion rotatable on a support by means of an adjustment knob and having two axially spaced arrays of gear teeth. The teeth of one of these arrays is angularly offset relative to the teeth of the other array. A lever connected to the load being moved is pivotal on the support and formed with two axially spaced racks each of which meshes with a respective one of the arrays of the pinion. The lever may be formed with a pair of axially joined plates each formed with a respective one of the racks and the pinion may have a radially outwardly extending flange projecting between these plates to insure that each rack remains in mesh with the respective array of teeth on the pinion. In addition a brake may be provided for resisting rotation of the pinion by the lever and for allowing rotation of the pinion by the shaft carrying this pinion.

7 Claims, 5 Drawing Figures

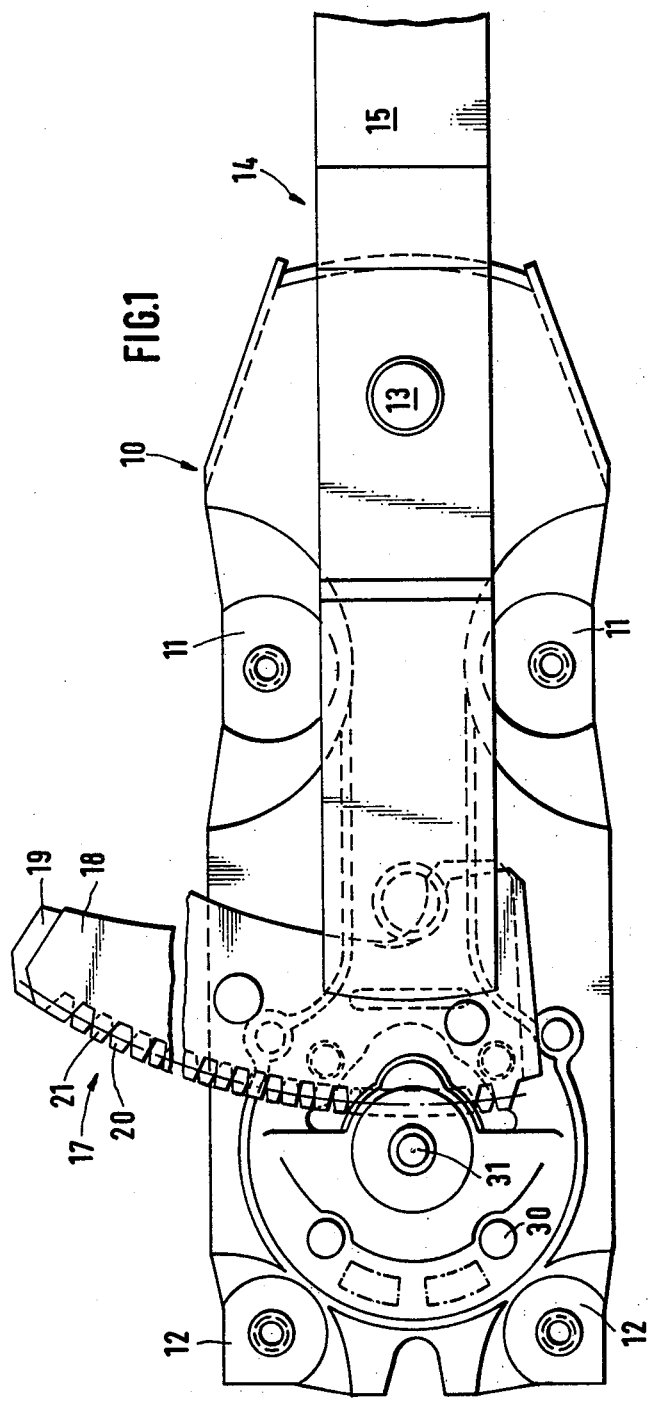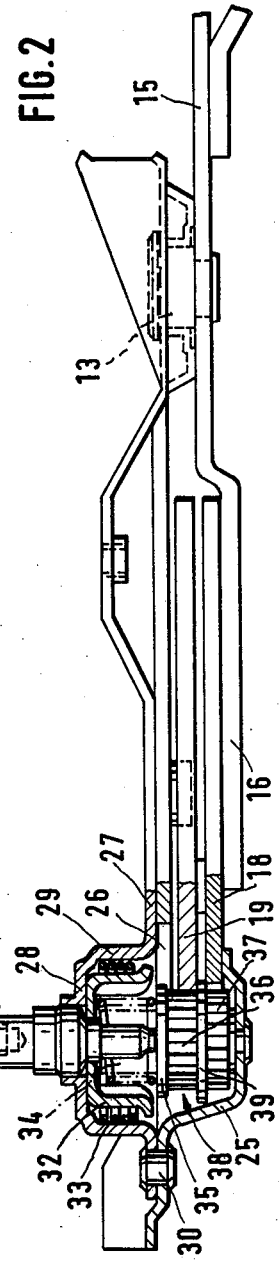

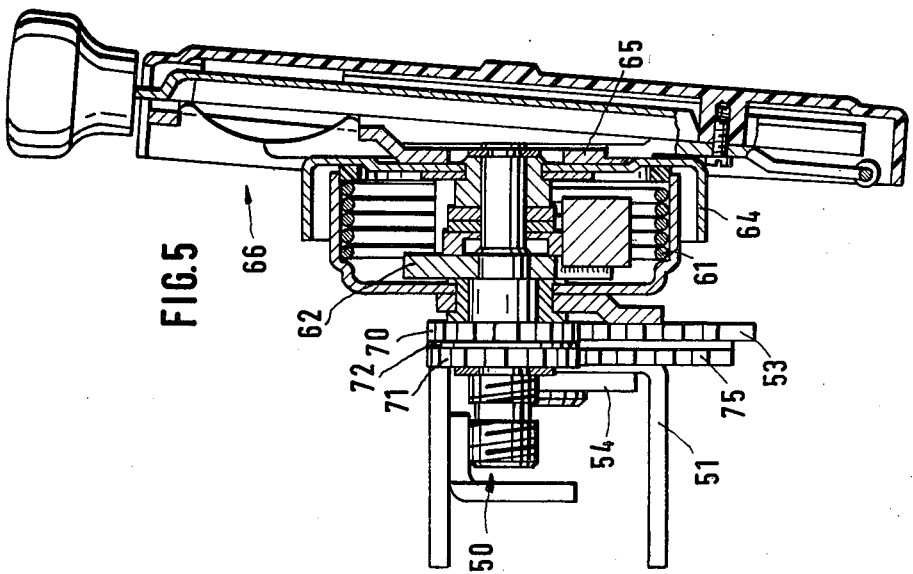
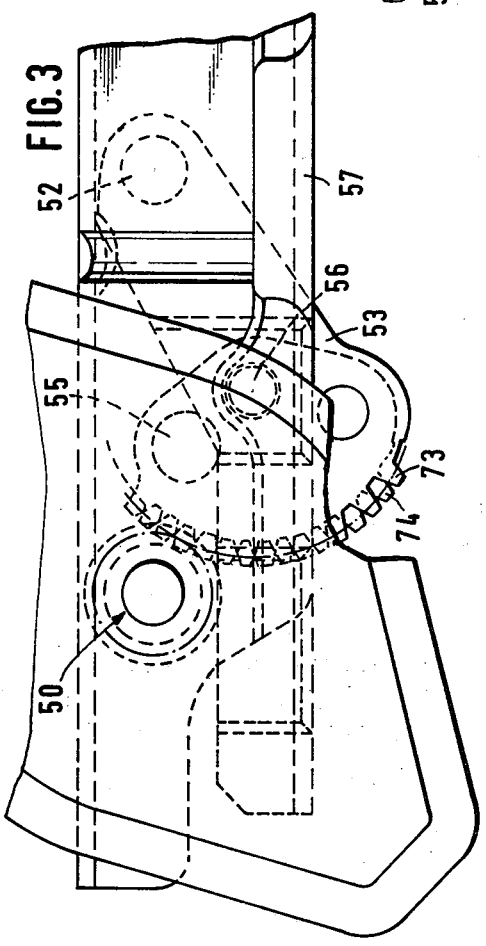
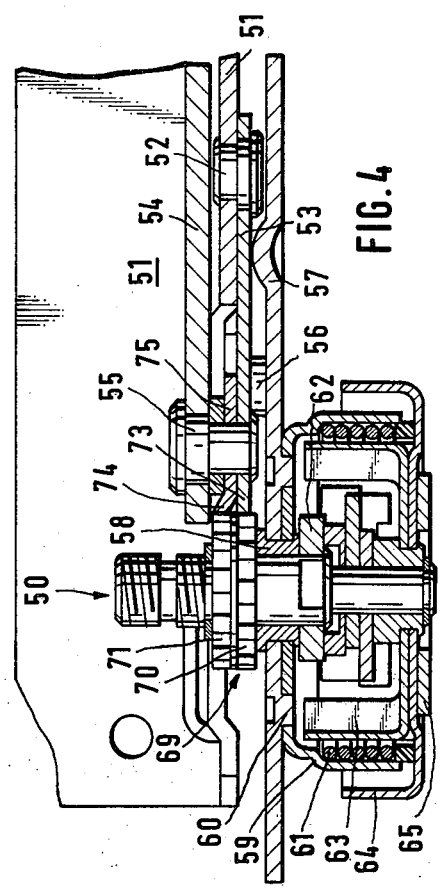

POSITIONING MECHANISM FOR AUTOMOTIVE SEAT, WINDOW OR SIMILAR PART

BACKGROUND OF THE INVENTION

The present invention relates to a positioning mechanism.

More particularly this invention concerns a positioning mechanism useable in an automotive vehicle for displacing a window, seat or the like.

An automotive vehicle is frequently equipped with at least one positioning mechanism which comprises a pinion rotatably mounted on a support and meshing with a rack formed on a lever also pivoted on the support. Normally the pinion is connected to a lever or handle so that the user can rotate it and thereby pivot the lever. Such an arrangement can be used to raise or lower the vehicle window, or to raise or lower the vehicle seat. The movable load normally is connected to the pivotal lever.

It is essential that this mechanism be extremely robust so as to withstand the long-term service that is required of it in an automotive vehicle. Furthermore, since the vehicle incorporating such mechanism must be produced at the lowest possible cost, it must be possible to mass-produce the mechanism at the lower possible expense. Finally, the mechanism must operate as smoothly as possible in order to allow the load spring positioned by the mechanism to be moved with relative ease.

Thus the disadvantages of the known systems fall into two main groups. On the one hand the positioning mechanism is made with a great deal of care, normally involving machining of the various elements for a tight fit, so that it is relatively expensive but gives a long service life and operates easily. On the other hand, when stamp gears or the like are used the play between them, which must be left in order to compensate for manufacturing tolerances, frequently is such that slip between the parts of the mechanism is possible. Thus although the rack on the lever may mesh perfectly with the pinion in one angular position of the lever, when displaced somewhat it meshes less well so that slippage can occur. Today it therefore seems virtually impossible to provide a positioning mechanism which both functions surely and easily, but which can be produced at a low cost.

SUMMARY OF THE INVENTION

It is therefore an object of the present invention to provide an improved positioning mechanism.

Another object is to provide an operating mechanism for displacing a motor-vehicle part such as a window or seat.

Yet another object is to provide such a mechanism which can be produced at relatively low cost, yet which has a long service life and which operates smoothly.

These objects are attained according to the present invention in a mechanism of the above-described general type wherein the pinion rotatable on the support is formed with two axially spaced arrays of gear teeth. The teeth of one of the arrays is angularly offset or staggered relative to the teeth of the other array. The lever pivotal on the support is formed with two axially spaced racks each of which meshes with a respective one of the arrays of the pinion, so that the teeth of the rack are also offset or staggered relative to each other.

Such a mechanism can be made of the necessary relatively small size, indeed not appreciably larger than the normally used positioning mechanism. In addition the use of double gear engagement ensures that a relatively smooth flow of force will be effected from the pinion to the lever. As there are two teeth engaging each other at all times, even when the device fits relatively loosely together due to close manufacturing tolerances, slippage between the pinion and the lever is almost entirely ruled out. Thus, it is possible to use a stamped-out lever and a stamped, forged or simply coarsely cast pinion in the arrangement. This holds manufacturing costs to a minimum, while the double gear engagement ensures that the operation of the device will be smooth and its service life will be quite long.

In accordance with further features of this invention the lever is formed as a pair of flat members each formed with a respective rack. Means is provided such as rivets connecting together these two members with the racks spaced axially slightly. It is also possible in accordance with this invention to make one of these flat members displaceable somewhat relative to the other, and to provide a spring between them so that the racks are held in tight engagement with the teeth and very smooth operation of the device results. Such an arrangement is particularly useful in a positioning mechanism for raising and lowering a motor vehicle seat, as the load in these arrangements is mainly exerted in only one direction.

The pinion itself may be formed as two parts each having a respective one of the arrays of gear teeth, but is preferably in accordance with this invention formed without machining or material removal as a single unitary piece. To this end it is advantageous to provide a radially outwardly extending flange between the two arrays of teeth so as to prevent the rack engaging the one array from accidentally engaging the other array.

In accordance with another feature of this invention there is provided between the pinion and the support a brake which resists rotation of the pinion by means of either of the racks, but allows rotation of the pinion when this rotation force is exerted through the shaft carrying the pinion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view partly broken away of an adjusting mechanism used for raising and lowering a motor-vehicle window;

FIG. 2 is a top view partly in section of the mechanism of FIG. 1;

FIG. 3 is a side view of an adjustment mechanism according to this invention here applied to an arrangement raising a motor-vehicle seat;

FIG. 4 is a top view in section of the arrangement of FIG. 3; and

FIG. 5 is a side sectional view of the arrangement of FIG. 3.

SPECIFIC DESCRIPTION OF PREFERRED EMBODIMENTS

The arrangement shown in FIGS. 1 and 2 has a support plate 10 securable via recesses 11 and 12 to the door panel of a motor-vehicle door. This arrangement is provided with a fulcrum or pivot pin 13 on which is mounted a two-arm lever 14 whose arm 15 is connected to the respective motor-vehicle window and whose arm 16 is provided with a toothed region 17 having a pair of racks 18 and 19. The teeth 20 of the rack 18 are staggered relative to the teeth 21 of the rack 19 as is best shown in FIG. 1.

The support plate 10 is provided with an arm 25 formed with a hole 26 over which is engaged the flange 27 of a cup 28. The wall 29 of this cup 28 constitutes a braking surface as will be described below and rivets 30 secure the flange 27 of the cup 28 to the arm 25. The above-described parts are all made of sheet steel for maximum strength and minimum cost.

A shaft 31 is pivotal in the cup 28 and defines an axis parallel to the axis of the pivot pin 13. This shaft 31 extends through the door panel to which the support plate 10 is secured and normally carries the handle that serves for opening and closing of the vehicle window 25 carried on the arm 15. This shaft 31 carries an entrainment member 32 which engages with claws or projections against the opposite sides of the bent-in ends of a spring 33 that presses radially against the surface 29. Whereas this element 32 engages on the turned-away sides of the spring ends, another element 34 is engaged between them and is connected via a ring 35 with a pinion 38 having arrays 36 and 37 of gear teeth. Thus the element 32 can angularly press against the element 34 through a respective side of the spring 33.

The two arrays 36 and 37 of the pinion 38 are separated by a flange 39 that prevents the racks 19 and 18 meshing with these arrays 36 and 37 from moving into engagement with the wrong array. The teeth of the arrays 36 and 37 are angularly staggered relative to each other so as to mesh with the staggered teeth 20 and 21.

The braking arrangement using the spring 33 functions as described in French Pat. No. 7,343,423, the entire disclosure of which is herewith incorporated by reference. Thus when the handle on the shaft 31 is rotated it bears against a spring end in such manner as to tighten the spring or decrease the overall diameter so as to pull it out of engagement with the stationary cup 28 and allow the elements 33 and 34 to rotate so that the pinion 38 can rotate. When, however, rotary force is exerted via the pinion 38 on the element 34, the spring ends are spread so that the spring 33 is pushed into tight engagement with the inner surface 29 and rotation of the various elements is resisted strongly. In this manner once the window is set in a given position it will not slip back down or vibrate loose from this position.

The rack elements 18 and 19 riveted to the arm 16 can be simple stampings, and the pinion 38 can be formed as a rough unmachined casting. Even though the manufacturing tolerances can be relatively wide, the use of double gearing ensures a smooth flow of force between the pinion 38 and the lever 14.

The arrangement in FIGS. 3 – 5 is useable for raising and lowering the seat part of an automotive-vehicle seat. In reality two such mechanisms are provided on each seat, interconnected by a common shaft 50 at one end of which is provided a knob or handle for operating both of the mechanisms as will be described below.

This arrangement has on each side of the seat a support plate 51. On each of the upright portions of these support plates 51 is a pair of pins 52 carrying links 53 one of which is visible in FIGS. 3 – 5. The second link which is not shown is connected via a further link 54 that itself is connected via a pin 55 to the shown link 53. The link 53 is in addition pivotal about a pin 56 which is carried on a support element 57 engaging under the seat. Thus the two links 53 are connected together in a parallelogrammatic linkage so as to raise and lower the element 57. The car seat is suspended on the element 57 which is hung via the pins 56 on four of the links 53 that in turn pivot about the axles or pins 52 on the support 51 that is secured to the floor of the car. All of these links 53 pivot together, the front link 53 being connected to the rear link 53 by means of the rigid coupling 54, and the two links 53 on each side being interconnected by the shaft 50 as will be described below. The seat therefore remains parallel relative to the support 51 and the floor of the car.

The seat carrier 57 is provided with journals 58 in which the shaft 50 can turn. In addition there is provided a cup 59 secured via rivets 60 to the seat carrier 57, the wall of the cup 59 being concentric with the pivot axle 50. Once again a spring 61 can bear radially on the inner surface of this cup 59 and has inwardly bent spring ends between which there is engaged an element carried on the shaft 50 and on both sides of which there is engaged an element 63 forming part of an entrainment arrangement 62. The element 63 is rotationally carried on a cover cup 64 which in turn is fixed to a foot portion or plate 65 of an adjustment handle or lever 66.

In a manner described above, the element 66 when turned will exert via the claws of the element 63 a force on the spring tending to tighten this spring and pull it away from the wall of the cup 59 so as to allow rotation of the handle 66 and entrainment of the shaft 50. When a rotation force is exerted on the shaft 50, however, this will spread the ends of the spring 61 and tighten the brake.

A pinion 69 is fixed on the shaft 50 and has two arrays 70 and 71 of gear teeth, once again the teeth being offset angularly from each other and a flange 72 being provided between them. The one link 53 is provided with a rack 73 which meshes with the array 70, while a rack 74 meshes with the array 71. A bent-out plate 75 on the link 53 is formed with the rack 74. Once again the teeth of the racks 73 and 74 are offset or staggered relative to each other as best shown in FIG. 3. Rotation of the shaft 50 therefore is transferred to the front links 53.

It also lies within the scope of this invention to provide three or more such arrays of teeth on the pinion engaging with corresponding racks for maximum smoothness and force transmission. In such an arrangement the offset would be less than half a tooth width for smoothest possible operation. It is also noted that the adjustment or positioning mechanism shown above can be applied to many other arrangements. In particular the various adjustable portions of an automotive vehicle other than the seats and the windows can be provided with such a positioning mechanism.

It will be understood that each of the elements described above, or two or more together, may also find a useful application in other types of structure differing from the types described above.

While the invention has been illustrated and described as embodied in a positioning mechanism, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A positioning mechanism comprising:
    a support;
    a pinion rotatable on said support about a pinion axis and formed with two axially spaced arrays of gear teeth, the teeth of one of said arrays being angularly offset and staggered relative to the teeth of the other array; and
    a lever pivotal on said support and formed with two axially spaced racks, one meshing with said one array and the other meshing with said other array.

2. The mechanism defined in claim 1 wherein said lever is a pair of axially joined plates each formed with a respective one of said racks.

3. The mechanism defined in claim 2, further comprising means rigidly joining said plates axially together.

4. The mechanism defined in claim 2 wherein said plates are substantially identical.

5. The mechanism defined in claim 1 wherein said pinion is formed between said arrays with a radially projecting flange.

6. The mechanism defined in claim 1 wherein said lever is pivotal on said support and said racks are arcuate.

7. The mechanism defined in claim 1, further comprising a shaft journaled in said support and carrying said pinion and means connected between said pinion and said support for resisting rotation of said pinion by said lever and for allowing rotation of said pinion by said shaft.

* * * * *